United States Patent [19]

Lipsky

[11] 4,312,053

[45] Jan. 19, 1982

[54] RANGE AND DEPTH DETECTION SYSTEM

[75] Inventor: Alan H. Lipsky, Flushing, N.Y.

[73] Assignee: Subcom, Inc., Glen Cove, N.Y.

[21] Appl. No.: 204,574

[22] Filed: Dec. 3, 1971

[51] Int. Cl.³ ............................................... G01S 5/18
[52] U.S. Cl. ...................................... 367/127; 367/97
[58] Field of Search ................... 340/3 R, 6 R, 16 R; 367/97, 127, 124, 117

[56] References Cited

U.S. PATENT DOCUMENTS 3,622,963  11/1971  Sage ...................................... 367/97

*Primary Examiner*—Richard A. Farley

*Attorney, Agent, or Firm*—Bauer & Amer

[57] ABSTRACT

The method and apparatus for computing the range to and depth of a submerged object that either emits or reflects pulses of acoustic energy, wherein a detecting array and related data handling apparatus measure as a function of time the apparent angles of arrival of the acoustic energy associated with each such pulse. This data is then translated into actual multipath arrival angles and multipath travel time differences which are utilized to solve mathematical equations, the solutions of which result in the calculation of the range to and depth of the submerged source of acoustic energy.

7 Claims, 4 Drawing Figures

RANGE AND DEPTH DETECTION SYSTEM

BACKGROUND AND OBJECTS OF THE INVENTION

This invention is directed to a new and improved method of computing the range to and depth of a submerged object that is capable of either emitting or reflecting transient pulses of acoustic energy and the apparatus for carrying out said method. Although the invention has wide applicability in computing the position of an object within a variety of media, wherein a variety of monitoring apparatus can be utilized, it is particularly suited for utilization as a means for computing the range to and depth of an object submerged within an aquatic environment, as for example, a portion of a vessel, a submerged submarine, a torpedo, a transponder mounted on a diver or other objects whose surveillance is desired, schools of fish or other forms of aquatic life, or the point of detonation of a charge of explosives utilized in a geological survey wherein the monitoring apparatus utilized is sonar.

The need to be able to readily and accurately calculate the range and depth of objects within an aquatic environment has always existed, and has in fact increased over the years, particularly as a result of the advances made in the techniques of undersea warfare. With the increased capabilities of the submarines of today, calculations and the means for making the same to determine range and depth thereof, have taken on a new significance.

Means to measure only the range to a transponder have long been available, although many of the techniques were generally recognized to be rigorously accurate only for idealized situations. None of these techniques, however, provided for the direct and accurate calculation of both the range and depth to a source of acoustic energy, be it active or passive in nature, or enable such calculations under other than idealized circumstances.

It is widely recognized that energy representative of a particular signal pulse emitted from a coherent source rarely arrives at a second receiving or monitoring location by only one path. Generally, the pulse of energy arrives almost, but not quite, simultaneously, by a number of "multipaths" and thus appears to monitoring apparatus, as for example a sonar array, located at the monitoring location, as a number of separate or overlapping pulses of energy that are spaced over a defined interval of time with varying angles of arrival. The nature of these multipaths and the manner by which they are created by the essentially laminar construction of the reflecting surfaces and refracting layers in the ocean are described in standard texts on sound propagation, as for example, "Principles of Underwater Sound For Engineers," by Robert J. Urick, published by McGraw-Hill, Inc., 1967.

The multipaths of energy representative of a single pulse tend to occur in pairs of "doublets." For example, such energy pulses arriving at the receiver from a "down" or bottom direction will travel by two paths which are closely spaced angularly. One path will involve only one reflection from the bottom. The other path will consist of, first, a reflection from the surface, then a reflection from the bottom. Such energy arriving from an "up" or surface direction will also follow two closely spaced paths. One will involve, in order, a surface reflection, a bottom reflection, and a second surface reflection. The other will involve, first, a bottom reflection, then a surface reflection.

Both in the ocean with acoustic energy, and over the ocean with radar pulses, energy will also be received by a direct path and by a reflection (in the acoustic case) off the bottom, and in the radar case, by a reflection off the ocean surface. The direct and one reflection paths constitute a third "doublet" pair.

Through the use of existing methods of sound wave ray tracing techniques, these multipaths can be traced from source to monitoring receiver and from monitoring receiver to source if the vertical angles of arrival formed by the multipaths intersecting the imaginary plane passing through the monitoring receiver and parallel to the surface of the ocean environment are known. By accurately measuring the vertical angle of arrival of at least two multipaths associated with a particular signal pulse, a mathematical computation can be carried out to solve for the range to and depth of the source of the acoustic energy.

Current difficulties in carrying out the above computations arise from a general inability of existing sonars to measure the vertical angles of arrival of each member of the closely associated pairs of paths to sufficient accuracy and/or resolution so as to obtain consistent and reliable computations for range and depth. Sonars available to date can generally measure the arrival angle of a single path to accuracies approaching 0.1 degrees. However, when presented with closely spaced multipaths, whose arrivals at the sonar array overlap in time, as would be the case in operational utilization of the herein disclosed technique, existing sonars indicate the centroid angle of the arriving energy paths which can be as much as 6 to 10 degrees removed from any of the actual arriving multipaths. Although under certain idealized circumstances the above inaccuracies can be minimized and thereby prove acceptable, they generally prove to be too large to be of practical value, particularly in determining the depth of the object which is emitting or reflecting pulses of acoustic energy.

It is, therefore, an object of this invention to devise a new and improved method of measuring the range to and depth of a source of acoustic energy that overcomes the disadvantages of the prior art methods.

It is another object of this invention to devise a method of measuring the range to and the depth of a source of acoustic energy that results in accurate computations for range and depth that is not restricted to idealized sets of conditions.

It is another object of this invention to devise a method of measuring the range to and the depth of a source of acoustic energy that is independent of sonar beam resolution.

It is another object of this invention to devise a method of measuring the range to and the depth of a source of acoustic energy that does not necessarily require measurement of the true angles of arrival of the various multipath arrivals of energy.

It is another object of this invention to devise a method of measuring the range to and the depth of an object submerged within an aquatic environment that can utilize either an active or passive sonar array.

It is another object of this invention to devise apparatus for carrying out each of the above named objects of this invention.

It is another object of this invention to devise a method of measuring the range to and the depth of an object submerged within an aquatic environment that can distinguish between genuine multipath pulses of energy originating from a coherent source of acoustic energy and pulses of energy that are representative of environmental noise.

The objects and advantages of the invention are set forth in part herein and in part will be obvious therefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved method, and apparatus for carrying out said method, for computing the range to and the depth of an object submerged within a medium, the object being capable of either actively emitting pulses of acoustic energy or passively reflecting such energy. Although the invention has wide applicability, it is particularly suited for utilization in computing the range to and depth of an object submerged within an aquatic environment wherein the monitoring apparatus is sonar.

As previously stated, a single pulse of energy emanating from an object submerged within an aquatic environment either as the result of the reflection of a beamed signal or as the result of a generated signal originating from the object itself, results in having the energy pulse follow through the aquatic medium a number of paths, referred to as multipaths, such that detecting apparatus operative at a monitoring point receives the originating pulse of energy as an indication of a number of separate pulses of energy each arriving at the monitoring point over separate multipaths and confined within a definite time interval.

The multipaths occur in pairs or "doublets;" each doublet consisting of two separate but associated paths which, when they arrive at the receiver, are separated by a small angle. In general, the angle between the two paths of a doublet is too small to be resolved by a sonar beam of normal width. As for example, the so-called bottom bounce path, for a pulse originating at any depth but the surface, always consists of two paths. However, the sonar beam will normally null on the centroid of energy of the two paths, so that the presence of the doublet is norally undetected.

In accordance with one embodiment of the invention, the multipaths of energy pulses associated with a source of acoustic energy are detected by a sonar array that provides at its output the apparent vertical angle of arrival of said multipaths as a function of the time of arrival. This information is then translated into a format for processing and storage by data handling equipment.

By comparing the above characteristics for each of the paths associated with a particular pulse of acoustic energy, the angles of arrival associated with the multipath pulses of energy are determined as well as the time intervals between the doublets of said multipath pulses. By substituting the values of either two of said angles of arrival of a doublet, two of said time differences or one of said angles of arrival and one of said time differences into appropriate mathematical formulae and then carry forth their solution, the range to and depth of a submerged source of acoustic energy can be accurately determined.

It will be understood that the foregoing general description and the following detailed description as well are exemplary and explanatory of the invention, but are not restrictive thereof.

The accompanying drawings, referred to herein and constituting a part hereof, illustrate one embodiment of the invention, and together with the description serve to explain the principles of the invention.

DESCRIPTION OF A PREFERRED EMBODIMENT

Figure 1:
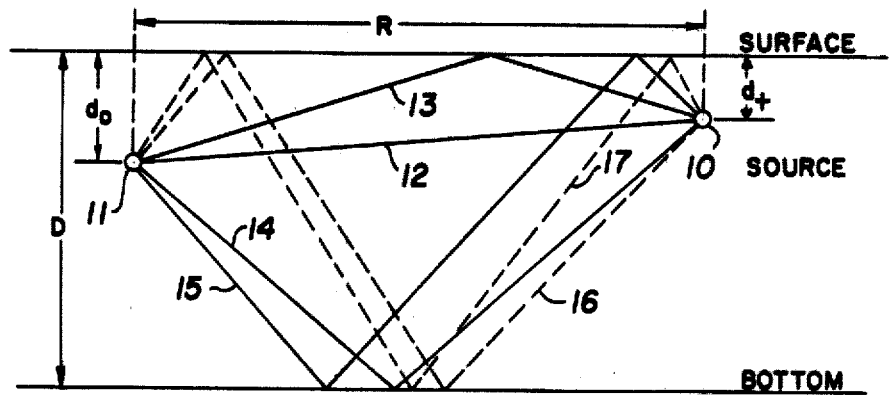
FIG. 1 is a vertical planar view of the multipath structure characteristic of a submerged source of acoustic energy that is monitored from a submerged location in accordance with the invention.

Referring now more particularly to the embodiment of the invention shown in the accompanying drawings, there is illustrated in FIG. 1 a typical multipath diagram associated with a submerged source of acoustic energy. Although the present invention has wide applicability, for the purposes of setting forth an illustrative embodiment, the discussion will be directed to an ocean environment wherein the source of the acoustic energy is a submerged portion of a vessel as a submarine whose sonar is actively pinging while the monitoring point is also a submerged portion of a vessel as a submarine utilizing a passive sonar array for detecting the energy pulses generated by the active sonar of the first submarine.

For all practical purposes, and at moderate ranges, a particular pulse of energy will travel through an aquatic medium between two points contained within a vertical plane along six separate multipaths of varying lengths. As depicted in FIG. 1, a submerged source of acoustic energy 10 is detected by a sonar array 11 as a result of energy pulses traveling through the aquatic medium via a direct line path 12, a path 13 having a reflection from off of the surface, a path 14 having a reflection from off of the bottom, a path 15 having a reflection from off of the surface then from off of the bottom, a path 16 having a reflection from off of the bottom then from off of the surface and a path 17 having a reflection from off of the surface, then from off of the bottom and then again from off of the surface. For purposes of simplicity and clarity of explanation, the paths are shown as straight lines. In situations where the velocity of sound varies as a function of depth, such paths could have some curvature. These six separate paths representative of the same pulse of energy but following six separate distinct paths, have their respective energy signals arriving at the sonar array (11) at various angles of arrival and at slightly varied points in time.

Theoretically, if a sonar could be developed that had infinite resolution and performed its measurements instantaneously, any source of acoustic energy could have its range and depth accurately calculated since it could be assumed that the angles of arrival determined by such a sonar for the energy multipaths representative of said source would always be accurate.

In actuality, however, an idealized sonar does not exist nor can it be relied upon that the source of acoustic energy whose location is being sought will emit pulses of energy whose multipath characteristics enables available sonar systems to accurately determine the angles of arrival for such multipaths.

The present invention's applicability to any multipath pattern of signals is based upon the fact that in addition to being able to calculate the range to and depth of a source of acoustic energy when the angles of arrival are determinable for two multipaths, the technique herein utilized is additionally capable of calculating range and depth without the need to calculate said angles of arrival and is thereby applicable to the situation when the signals arriving over the multipaths occur within a time interval that does not permit the monitoring sonar, even though it may have good resolution characteristics, to differentiate between such multipath arrivals. Whereas the prior art techniques, under the above circumstances, would either be unable to utilize the generated signals to calculate range and depth or would utilize as the angle of arrival an angle indicative of the centroid angle for such multipath arrivals, thereby accepting an inherent error in the calculations, the present invention permits accurate calculation for depth and range regardless of the multipath signal characteristics.

The above is accomplished by the realization that meaningful information that would enable the solution of certain mathematical formulations which would, in turn, result in the determination of the range to and the depth of a source of acoustic energy, is available from data readily available from a sonar output and which, heretofore, was felt to be of little value; namely, the measured, or apparent, vertical angle of arrival versus time sequence of the energy traveling the multipaths. In particular, that information which, in accordance with this invention, is of value, is the vertical angle of arrival during the brief time when a component of a doublet arrives along such as occurs at the beginning and end of a received pulse, and the time interval between when energy traveling the shorter multipath route of a doublet of multipaths begins to arrive and when energy traveling the longer path of said doublet begins to arrive, hereinafter referred to as the doublet travel time interval. By determining either the vertical angle of arrival with respect to two multipaths representative of the same pulse of acoustic energy, the doublet travel time interval with respect to two doublets of multiple signals representative of the same pulse of acoustic energy or a single vertical angle of arrival with respect to one multipath pulse and a doublet travel time interval, both measurements occurring with respect to the same multipath pattern representative of a single pulse of acoustic energy, mathematical equations can be solved based upon such data that will determine the range to and depth of the originating source of acoustic energy.

Figure 2:
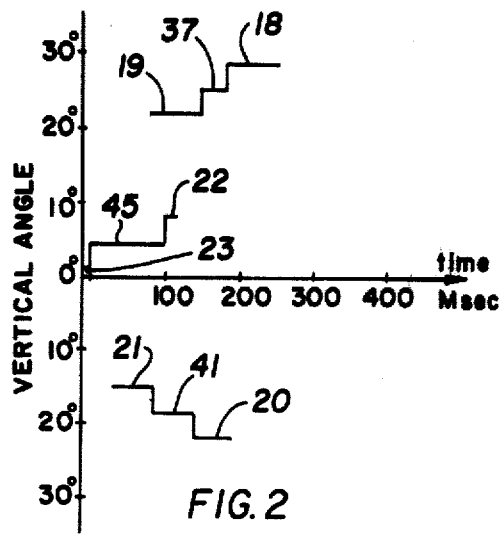
FIG. 2 is a graphical representation of the angle of arrival versus time sequence of the multipath structure depicted in FIG. 1.

With the above in mind and in order to better understand the above-mentioned concepts, reference is now made to FIG. 2 which is a graphical plot of the angle of arrival versus time sequence that would be detected by a practical sonar when a pulse travels the multipath structure represented in FIG. 1. As illustrated, the dipole composed of multipaths 17 and 16 of FIG. 1 appears as the continuous plot composed of Sections 19, 37 and 18 in FIG. 2. The dipole composed of multipaths 14 and 15 appears as the continuous plot 21, 41 and 20. The dipole composed of multipaths 12 and 13 of FIG. 1 appears as the continuous plot composed of 23, 45 and 22.

FIG. 2 is the vertical angle versus time sequence that would be formed by a sonar capable of resolving rays that are more than 12 degrees apart. Such performance is representative of many practical sonars. The continuous plot 19, 37 and 18 is formed by the pulse of energy first arriving over multipath 16 whose vertical angle of arrival, as depicted in FIG. 2, is approximately 22 degrees. When energy begins to arrive over multipath 17, the sonar indicates some intermediate angle between the two paths, the energy centroid, indicated by Section 37 and depicted in FIG. 2 as approximately 25 degrees. After the pulse over path 16 dies down, the pulse traveling path 17 persists for some time. During this time, the sonar indicates an arrival angle of approximately 28 degrees that coincides with the true angle of arrival of multipath 17. The other continuous plots 23, 45 and 22, and 21, 41 and 20 are formed in similar manners.

FIG. 2 represents the vertical angle versus time sequence that is produced by a particular pulse width, geometry, sound velocity structure, and sonar aperture. Varying any one of these alters the pattern. Thus, with a different sound velocity profile or geometry, one or more of the multipaths that contribute to the pattern in FIG. 2 might be missing; with shorter "pulses" particularly, the overlap in pulses arriving over different paths might not occur; with sonars of low aperture to wave length ratios, it may not be possible to resolve the dipoles.

Figure 3:
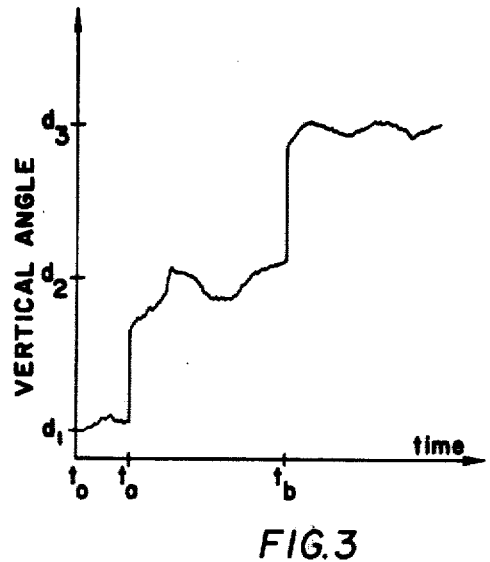
FIG. 3 is an enlarged view of a portion of the graphical representation illustrated in FIG. 2.

Reference is now made to FIG. 3 which is an enlarged view of the plot of the graphical representation illustrated in FIG. 2 that relates to multipaths 12 and 13. As illustrated in FIG. 3, a fluctuating plot of the angle of arrival of multipath 12 appears between times $t_o$ and $t_a$ at approximately $d_1$ degrees. At point $t_a$, the plot of the angle of arrival jumps in magnitude to fluctuate around $d_2$ degrees between points in time $t_a$ and $t_b$ as a result of the overlap in detection between multipaths 12 and 13. At point $t_b$ there is another jump in the plot of the angle of arrival to a magnitude that fluctuates around the level $d_3$ degrees as a result of the disappearance of multipath signal 12 and the appearance of multipath signal 13.

In accordance with the invention, determination of the quantity $t_a$, that is, the time interval between the appearance of multipath pulse 12 and the appearance of multipath pulse 13, hereinbefore defined as the doublet travel time interval, and/or the angles $d_1$ and $d_3$, which are the vertical angles of arrival of multipaths 12 and 13 respectively, enables solution of mathematical formulae to thereby determine the range to and depth of the source of acoustical energy. In addition, given a plot similar to that depicted in FIG. 3 for another doublet of multipath pulse representative of the same pulse of acoustic energy for which the plot in FIG. 3 is representative, the comparable quantity for $t_a$ of FIG. 3 in this additional plot, in combination with the value for $t_a$, in accordance with this invention, would enable solution of mathematical formulae to thereby determine the range to and depth of the source of said pulse of acoustic energy.

As stated previously, solution for the range to and depth of a source of acoustic energy can be accomplished if two vertical angles of arrival representative of a single pulse of acoustic energy for two multipath pulses are known, two doublet travel time intervals as to two separate doublets of multipath pulses representative of a single pulse of acoustic energy are known or one vertical angle of arrival of a multipath pulse and one doublet travel time interval for a doublet of multipath pulses from said same multipath pattern are known.

In accordance with the invention, to solve for the range to and depth of a source of acoustic energy wherein two angles of arrival are known, as would be the case depicted in FIG. 2 by plot 23-45-22, the following mathematical formulations requirements simultaneous solutions; namely:

$$R = \frac{2 d_o}{\tan e_d + \tan e_s} \text{ and}$$

$$d_t = \frac{\tan e_s - \tan e_d}{\tan e_d + \tan e_s}$$

wherein:
R = the straight line surface distance between source 10 and sonar array 11, also referred to as range.
$d_o$ = the depth of monitoring point designated as sonar array 11.
$e_d$ = the vertical angle of arrival for multipath pulse 12.
$e_s$ = the vertical angle of arrival for multipath pulse 13.
$d_t$ = the depth of source 10.

In accordance with the invention, to solve for the range to and depth of a source of acoustic energy wherein two doublet travel time intervals are known as to two separate doublets of multipath pulses representative of a particular source of acoustic energy as would be the case depicted in FIG. 2 by plots 21-41-20 and 23-45-22, the following mathematical formulations require simultaneous solutions; namely:

$$Ct_1 = \sqrt{R^2 + (d_o + d_t)^2} - \sqrt{R^2 + (d_o - d_t)^2}$$

$$Ct_2 = \sqrt{R^2 + (2D - d_o + d_t)^2} - \sqrt{R^2 + (2D - d_o - d_t)^2}$$

wherein:
R = the straight line surface distance between source 10 and sonar array 11, also referred to as range.
$d_o$ = the depth of monitoring point designated as sonar array 11.
$d_t$ = the depth of source 10.
C = the speed of sound.
D = the overall depth of the ocean at the point of measuring.
$t_1$ = the doublet travel time interval for the multipath doublet comprising multipath pulses 12 and 13.
$t_2$ = the doublet travel time interval for the multipath doublet comprising multipath pulses 14 and 15.

To solve for the range to and depth of a source of acoustic energy wherein one vertical angle of arrival is known with respect to one multipath pulse associated with a particular pulse of acoustical energy and one doublet travel time interval is also known as to a double of multipath pulses representative of said same pulse of acoustic energy, as would be the case depicted in FIG. 2 with respect to plots 19-37-18 and 21-41-20, the following mathematical formulations require simultaneous solutions; namely:

$$R = \frac{4d_o^2 - (Ct_1)^2}{2(Ct_1 + 2d_o \sin e_d)} \cos e_d$$

-continued $$d_t = d_o - \frac{4d_o^2 - (Ct_1)^2}{2(Ct_1 + 2d_o \sin e_d)} \sin e_d$$

wherein:
R = The straight line surface distance between source 10 and sonar array 11, also referred to as range.
$d_o$ = The depth of monitoring point designated as sonar array 11.
C = The speed of sound.
$t_1$ = The doublet travel time interval for the multipath doublet comprising multipath pulses 14 and 15.
$e_d$ = The vertical angle of arrival for multipath pulse 12.

Although each of the above recited equations can be solved by any number of means, the most suitable is by computer.

Figure 4:
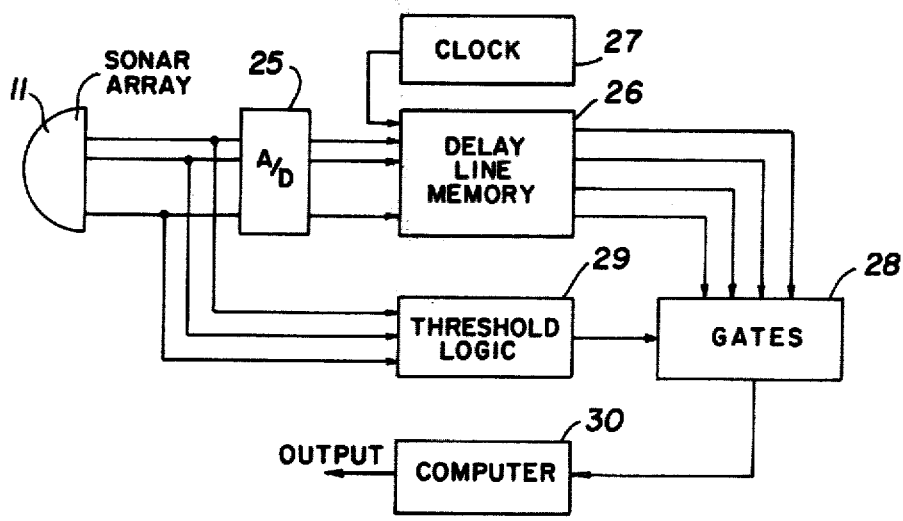
FIG. 4 is a functional block diagram of the apparatus utilized to implement the method of the present invention.

In keeping with the invention, reference is made to FIG. 4 wherein there is illustrated a functional block diagram as to the operation of this invention. In particular, there is illustrated a sonar array 11 capable of generating output signals in response to the detection of acoustical energy. The output signals from sonar array 11 are characteristic of the magnitude of the detected acoustic signal as well as its angle of arrival. These signals, which are in analog form, are fed from the sonar array to an analog-to-digital converter 25 which continually encodes its input into a binary coded output. This binary coded output, representative of the detected acoustic signal's magnitude and angle of arrival, is fed into a delay line memory 26 along with a coding from clock 27 that denotes the time of detection by the sonar array of said acoustic signal. The delay line memory 26 has its outputs coupled to gating elements 28 that are actuated by threshold logic circuitry 29 which, in turn, responds to a predetermined signal level generated by the sonar array. Since the delay line memory 26 provides a delay sufficient to enable the threshold logic 29 to make a decision and since the output of delay line memory 26 is controlled by threshold logic 29, meaningful data is not lost while unwanted data is not retained by the system. Thus, the gated output from the delay line memory that is fed into the memory of a general purpose computer 30 only contains data representative of acoustic signals detected by the sonar array.

The data fed to the computer permits the computer to carry out the mathematical solution of the previously referred to formulations such that the range to and depth of a source of acoustic energy can be readily computed. By applying known programming techniques to computer 30, the computer is enabled to receive the data associated with each energy multipath; namely, data setting forth the signal's magnitude, angle of arrival and as to the doublets of energy multipaths, the commencing of such multipaths, such that the computer is able to compute the doublet travel time interval, and with such information solve said formulations for the range to and depth of said source of acoustic energy.

The invention in its broader aspects is not limited to the specific embodiments herein shown and described but departures may be made therefrom within the scope of the accompanying claims, without departing from the principles of the invention and without sacrificing its chief advantages.

What is claimed is:
1. The method of determining from a monitoring point the range to and the depth of a submerged object from which pulses of acoustic energy may be received wherein mathematical formulations interrelating angle of arrival, range and depth are solved to obtain said quantities of range and depth, said method comprising the steps of:

(a) detecting the vertical angle versus time sequence associated with the multipaths of a particular pulse of acoustic energy emanating from said submerged object;

(b) examining the time sequence with respect to said multipath pulses so as to determine those multipath pulses that do not overlap as to their time of arrival at said monitoring point;

(c) determining said angles of arrival associated with said nonoverlapping multipath pulses; and (d) solving said mathematical formulations for the said quantities of range and depth by substitution therein of said angles of arrival associated with said nonoverlapping multipath pulses.

2. The method of determining from a monitoring point the range to and depth of a submerged object as described in claim 1 wherein said mathematical formulations comprise the following simultaneous equations:

$$R = \frac{2 d_o}{\tan e_d + \tan e_s}$$
$$d_t = \frac{\tan e_s - \tan e_d}{\tan e_d + \tan e_s}$$

wherein:
 $R$ = the range from the monitoring point to the source of acoustic energy
 $d_o$ = the depth of the monitoring point
 $e_d$ = the angle of arrival of one of said multipath pulses that does not overlap in time with another multipath pulse
 $e_s$ = the angle of arrival of a second of said multipath pulses that does not overlap in time
 $d_t$ = the depth of the source of acoustic energy.

3. The method of determining from a monitoring point the range to and the depth of a submerged object from which pulses of acoustic energy may be received wherein mathematical formulations interrelating the doublet travel time interval between doublet multipaths, range and depth are solved to obtain said quantities of range and depth, said method comprising the steps of:

(a) detecting the vertical angle versus time sequence associated with the multipaths of a particular pulse of acoustic energy emanating from said submerged object;

(b) determining the doublet travel time interval that exists between two pairs of multipath doublets representative of a pulse of acoustic energy emanating from said submerged object; and (c) solving said mathematical formulations for the said quantities of range and depth by substitution therein of said doublet travel time intervals associated with said pairs of multipath doublets.

4. The method of determining from a monitoring point the range to and depth of a submerged object as described in claim 3 wherein said mathematical formulations comprise the following simultaneous equations:

$$Ct_1 = \sqrt{R^2+(d_o+d_t)^2} - \sqrt{R^2+(d_o-d_t)^2}$$
$$Ct_2 = \sqrt{R^2+(2D-d_o+d_t)^2} - \sqrt{R^2+(2D-d_o-d_t)^2}$$

wherein:
 $R$ = the range from the monitoring point to the source of acoustic energy
 $d_o$ = the depth of the monitoring point
 $d_t$ = the depth of the source of acoustic energy
 $C$ = the speed of sound
 $D$ = the overall depth of the medium at the point of measuring
 $t_1$ = the doublet travel time interval for multipath pulses of a first doublet representative of a pulse of acoustic energy emanating from said submerged object
 $t_2$ = the doublet travel time interval for multipath pulses of a second doublet representative of said same pulse of acoustic energy emanating from said submerged object.

5. The method of determining from a monitoring point the range to and the depth of a submerged object from which pulses of acoustic energy may be received wherein mathematical formulations interrelating angle of arrival, doublet travel time interval between doublet multipaths, range and depth are solved to obtain said quantities of range and depth, said method comprising the steps of:

(a) detecting the vertical angle versus time sequence associated with the multipaths of a particular pulse of acoustic energy emanating from said submerged object;

(b) comparing the time sequence with respect to said multipath pulses so as to determine those multipath pulses that do not overlap as to their time of arrival at said monitoring point;

(c) determining one of said angles of arrival associated with said nonoverlapping multipath pulses;

(d) determining the doublet travel time interval that is associated with a multipath doublet representative of said particular pulse of acoustic energy emanating from said submerged object; and (e) solving said methematical formulations for the said quantities of range and depth by substitution therein of said one of said angles of arrival associated with a nonoverlapping multipath and said doublet travel time interval associated with said multipath doublet representative of said particular pulse of acoustic energy.

6. The method of determining from a monitoring point the range to and depth of a submerged object as described in claim 5 wherein said mathematical formulations comprise the following simultaneous equations:

$$R = \frac{4d_o^2 - (Ct_1)^2}{2(Ct_1 + 2d_o\sin e_d)} \cos e_d$$
$$d_t = d_o - \frac{4d_o^2 - (Ct_1)^2}{2(Ct_1 + 2d_o\sin e_d)} \sin e_d$$

wherein:
 $R$ = the range from the monitoring point to the source of acoustic energy
 $d_o$ = the depth of the monitoring point
 $C$ = the speed of sound
 $t_1$ = the doublet travel time interval for a multipath doublet representative of said pulse of acoustic energy emanating from said submerged object
 $e_d$ = the angle of arrival of a multipath pulse representative of said pulse of acoustic energy emanating from said submerged object.

7. A measuring system for measuring the range to and the depth of a submerged object from which pulses of acoustic energy may be received, said system comprising:
- (a) a detection means, capable of detecting multipath signals of acoustical energy and providing output signals indicative of the angles of arrival of said multipath signals;
- (b) an analog-to-digital converter, coupled to the output of said detection means and capable of converting the output from said detection means into a digital output;
- (c) a delay line memory coupled to the output of said analog-to-digital converter, for temporarily storing the digital output from said analog-to-digital converter;
- (d) clock means coupled to the input of said delay line memory capable of feeding time reference data into said delay line memory in combination with the signal inputs from said analog-to-digital converter so as to provide time references indicative of the initiation of an output signal from said analog-to-digital converter;
- (e) computing means coupled to the output of said delay line memory, said computing means being capable of solving mathematical formulations for the range to and depth of said source of transient pulses of acoustic energy based upon the data supplied from said delay line memory;
- (f) gating means coupled between the output of said delay line memory and the input of said computing means, said gating means being capable of regulating the input to said computing means; and
- (g) logic means coupled between the output from said sonar array and said gating means for regulating the conductive state of said gating means, said logic means causing said gating means to be rendered conductive whenever said sonar array output is above a predetermined magnitude so that data from said delay line memory is selectively fed to said computing means.

* * * * *